US008482404B2

(12) United States Patent
Zhang et al.

(10) Patent No.: US 8,482,404 B2
(45) Date of Patent: *Jul. 9, 2013

(54) NETWORK DIRECTED CELL BROADCASTS FOR EMERGENCY ALERT SYSTEM

(71) Applicant: Cingular Wireless II, LLC, Atlanta, GA (US)

(72) Inventors: Ming Zhang, Bellevue, WA (US); Jun Shen, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,279

(22) Filed: Nov. 29, 2012

(65) Prior Publication Data
US 2013/0084825 A1    Apr. 4, 2013

Related U.S. Application Data

(63) Continuation of application No. 11/498,572, filed on Aug. 2, 2006, now Pat. No. 8,368,530.

(51) Int. Cl.
*G08B 1/08* (2006.01)
*G08B 29/00* (2006.01)
*H04M 11/04* (2006.01)
*H04M 1/00* (2006.01)
*H04W 24/00* (2009.01)

(52) U.S. Cl.
USPC ............... 340/539.11; 340/506; 455/404.1; 455/456.1; 455/567

(58) Field of Classification Search
USPC ............... 340/539.11, 506; 455/404.1, 456.1, 455/567
See application file for complete search history.

(56) References Cited

U.S. PATENT DOCUMENTS

| | | | | |
|---|---|---|---|---|
| 6,970,724 B2* | 11/2005 | Leung | ............................ | 455/567 |
| 7,671,732 B1* | 3/2010 | Sennett et al. | ............ | 340/539.11 |
| 7,683,792 B2* | 3/2010 | Araiza-Boys | ................ | 340/601 |
| 7,844,286 B1* | 11/2010 | Sennett et al. | ................ | 455/466 |
| 7,907,930 B2* | 3/2011 | Grevers, Jr. | ................ | 455/404.1 |
| 8,018,333 B2* | 9/2011 | Sennett et al. | ............ | 340/539.11 |
| 8,204,525 B2* | 6/2012 | Sennett et al. | ................ | 455/466 |
| 8,320,873 B2* | 11/2012 | Sennett et al. | ............. | 455/404.1 |
| 2004/0103158 A1* | 5/2004 | Vella et al. | .................... | 709/206 |
| 2004/0203562 A1* | 10/2004 | Kolsrud | ..................... | 455/404.1 |
| 2004/0259568 A1* | 12/2004 | Patel | .......................... | 455/456.1 |
| 2005/0037728 A1* | 2/2005 | Binzel et al. | ................ | 455/404.1 |
| 2006/0058005 A1* | 3/2006 | Dolezal et al. | ............. | 455/404.1 |
| 2006/0178128 A1* | 8/2006 | Eaton et al. | ................ | 455/404.1 |

(Continued)

*Primary Examiner* — George Bugg
*Assistant Examiner* — Jack K Wang
(74) *Attorney, Agent, or Firm* — Woodcock Washburn LLP

(57) ABSTRACT

Systems and methods for providing alerts to end users of networked enabled portable devices are provided so that the end users are made aware when broadcast emergency alerts are issued. The systems and methods provide a way for a portable device to receive information about an emergency alert broadcast of which the user should be aware, e.g., from the EAS, and to notify the user of the emergency alert. A flag provides an indication the EAS should be on and the systems and method override the settings made by a user to a portable device to enable EAS reception. The user may then be automatically taken to the emergency alert information by having the portable device automatically tune to the emergency broadcast information, or the user may optionally retrieve the emergency information by tuning to the emergency broadcast channel, or the user may otherwise be presented with a reference to the emergency data (e.g., a link to the information).

17 Claims, 6 Drawing Sheets

U.S. PATENT DOCUMENTS

| | | | |
|---|---|---|---|
| 2007/0024114 A1* | 2/2007 | Narita et al. | 303/174 |
| 2007/0198733 A1* | 8/2007 | Matsubara | 709/230 |
| 2007/0206773 A1* | 9/2007 | Branam | 379/265.09 |
| 2007/0252688 A1* | 11/2007 | Eisold et al. | 340/506 |
| 2007/0254623 A1* | 11/2007 | Branda et al. | 455/404.1 |
| 2007/0280138 A1* | 12/2007 | Stern | 370/254 |
| 2008/0034114 A1* | 2/2008 | Ducey et al. | 709/238 |
| 2008/0048873 A1* | 2/2008 | Araiza-Boys | 340/601 |
| 2008/0224884 A1* | 9/2008 | Kennedy | 340/825.52 |
| 2010/0107192 A1* | 4/2010 | Sennett et al. | 725/33 |

\* cited by examiner

NETWORK DIRECTED CELL BROADCASTS FOR EMERGENCY ALERT SYSTEM

CROSS REFERENCE TO RELATED APPLICATIONS

The instant application is a continuation of, and claims priority to, U.S. patent application Ser. No. 11/498,572 filed Aug. 2, 2006. U.S. patent application Ser. No. 11/498,572 is incorporated by reference herein in its entirety.

FIELD OF THE INVENTION

The present invention is directed to a notification framework and methods for reporting emergency alerts, such as those issued by the Emergency Alert System ("EAS").

BACKGROUND

Some existing broadcast technologies, such as Cell Broadcast, Multimedia Broadcast/Multicast Service ("MBMS"), and video broadcast, e.g., Digital Video broadcast-Handheld ("DVB-H"), MediaFLO, have been proposed to support emergency alert notification(s) to wireless subscribers. A problem with such broadcast technologies, however, is that the end user does not know when an emergency alert is broadcast, and thus does not know that they need to tune to an appropriate broadcast channel for the emergency alert information.

While it has been proposed to continuously monitor the wireless subscriber's handset to determine if an emergency alert is being broadcast, continuous monitoring by the wireless subscriber's handset of the various broadcast technologies to determine if an emergency alert is being issued will likely have a major impact on the handset battery life depending upon which broadcast technology/technologies are being continuously monitored (e.g., Cell Broadcast). With current battery life limits, the end user experience would be impacted due to reduced handset battery life.

Accordingly, improved ways of notifying users of EAS alerts via networked portable devices supporting telephony radio network and/or broadcast technologies are desired. Moreover, ways of notifying users of alerts are desired that do not require ongoing polling of an emergency communication channel.

SUMMARY OF THE INVENTION

The invention provides systems and methods for providing alerts to end users of networked enabled portable devices so that the end users are made aware when emergency alerts are issued. Some portable devices may be capable of receiving EAS broadcasts, but may optionally disable the feature. The various preferred embodiments describe a way for a portable device to receive information about an emergency alert of which the user should be aware, e.g., from the EAS, and to notify the user of the portable device of the emergency alert without requiring action of the user even when the EAS broadcast reception has been disabled. A system and method enable the EAS broadcast reception on the portable device such that it can then automatically tune to the emergency broadcast information, or the user may otherwise be presented with a reference to the emergency data (e.g., a link to the information).

Other features of the invention are described in more detail below.

BRIEF DESCRIPTION OF THE DRAWINGS

The systems and methods for alerting in accordance with the invention are further described with reference to the accompanying drawings in which.

DETAILED DESCRIPTION OF ILLUSTRATIVE EMBODIMENTS

Overview

Figure 1:
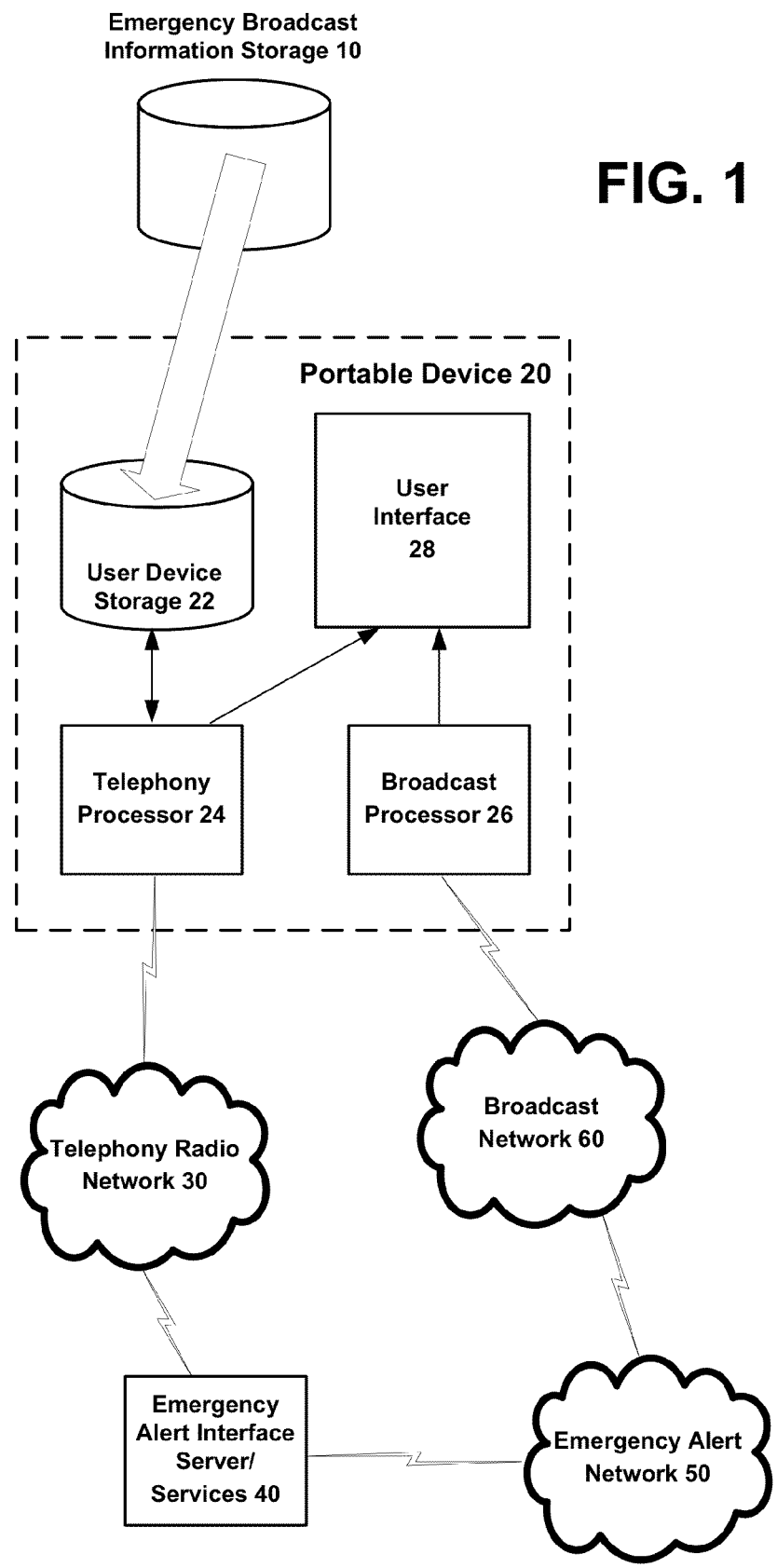
FIG. 1 illustrates an exemplary, non-limiting reporting framework for informing users of portable devices of emergency broadcast alerts in accordance with the invention.

As described in the background, with current implementations of broadcast technologies, there are no indications to end users that an emergency alert is being broadcast using broadcast technologies. Therefore, subscribers or users of portable devices having broadcast capabilities, such as cell phones or the like, do not know when an emergency alert may be broadcast over any of the broadcast technologies. Moreover, any attempt to continuously monitor for emergency alerts may have unnecessary negative impact on battery life.

Accordingly, the system and methods described herein simultaneously addresses both problems since (1) user device battery life does not become drained because the systems and methods described avoid continuous monitoring of broadcast technologies and (2) the user can be notified in real-time via an emergency alert mechanism of the invention which is implemented on the user device, and supported by one or more telephony radio networks.

Thus, in various embodiments, the system and methods described provide a way for a portable device to receive information about an emergency alert of which the user should be aware, e.g., from the EAS, and to notify the user of the portable device of the emergency alert without requiring action of the user. The user may then automatically view the emergency alert information, optionally retrieve the emergency information by tuning to the emergency broadcast channel, or be presented with a reference to the emergency data (e.g., a link to the information) so that a user can otherwise view the emergency information.

Systems and Methods for Providing EAS Alert Notification

To avoid the continuous monitoring of a broadcast channel for emergency alert information, a portable device in accordance may receive information about an emergency alert of which the user should be aware, e.g., from the EAS, in order to notify the user of the emergency alert without requiring action from the user to find out about the presence of the emergency alert.

An emergency alert indicator bit on control channel(s) of a telephony network with which the device communicates can be monitored. When the user device detects the setting of the emergency alert indicator bit on the control channel(s) that it is already monitoring, the device is able to immediately lead the user to the emergency information, or instruct the end user with pre-provisioned information about the emergency alert, and any associated broadcast channels that contain the emergency alert. In this fashion, the user device does not have to continuously monitor the broadcast channels for any possible emergency alerts.

The user may be notified via any one or more of visual feedback by the portable device (e.g., a display of the portable device, backlighting, LEDs, etc.), auditory feedback (e.g., an alarm sound) or mechanical feedback (e.g., vibration of the phone). In addition, whether displayed automatically or at the option of the user, the emergency alert information may be rendered by the portable device via a display (e.g., symbols, pictures, text, etc.) and/or an audio speaker (e.g., pre-recorded EAS voice message, text-to-speech signal, etc.) and/or any other known form of human communication (e.g., Morse code).

As shown in more detail in the block diagram of FIG. 1, a portable device 20 is shown for receiving notifications of emergency alert information. In FIG. 1, for the avoidance of doubt, portable or mobile devices 20 may include a variety of computing devices including (a) portable media players, e.g., portable music players, such as MP3 players, walkmans, etc., (b) portable computing devices, such as laptops, personal digital assistants ("PDAs"), cell phones, portable email devices, thin clients, portable gaming devices, etc., (c) consumer electronic devices, such as TVs, DVD players, set top boxes, monitors, displays, etc., (d) public computing devices, such as kiosks, in-store music sampling devices, automated teller machines (ATMs), cash registers, etc., (e) navigation devices whether portable or installed in-vehicle and/or (f) non-conventional computing devices, such as kitchen appliances, motor vehicle controls (e.g., steering wheels), etc. Moreover, while some embodiments are directed to systems and method for use in portable devices, as one of ordinary skill in the art can appreciate, the techniques of the invention are by no means limited to practice on portable devices, but may also apply to standalone computing devices, such as personal computers ("PCs"), server computers, gaming platforms (e.g., Xbox), mainframes, etc.

Returning to FIG. 1, in one embodiment of the invention, storage 22 on the user device 20 is populated with emergency broadcast information from a network-based emergency broadcast information database 10. As one of ordinary skill in the art can appreciate, this information can be provided and updated via over the air programming methodologies. Emergency broadcast information may, for instance, include the following types of information: (A) information about available broadcast technologies (e.g., Cell Broadcast, MBMS, DVB-H, MediaFLO, etc.), (B) information concerning which broadcast technologies or network(s), such as broadcast network 60, are specifically supported by the device 20 and (C) information about emergency broadcast channels associated with each available broadcast technology.

Figure 2:
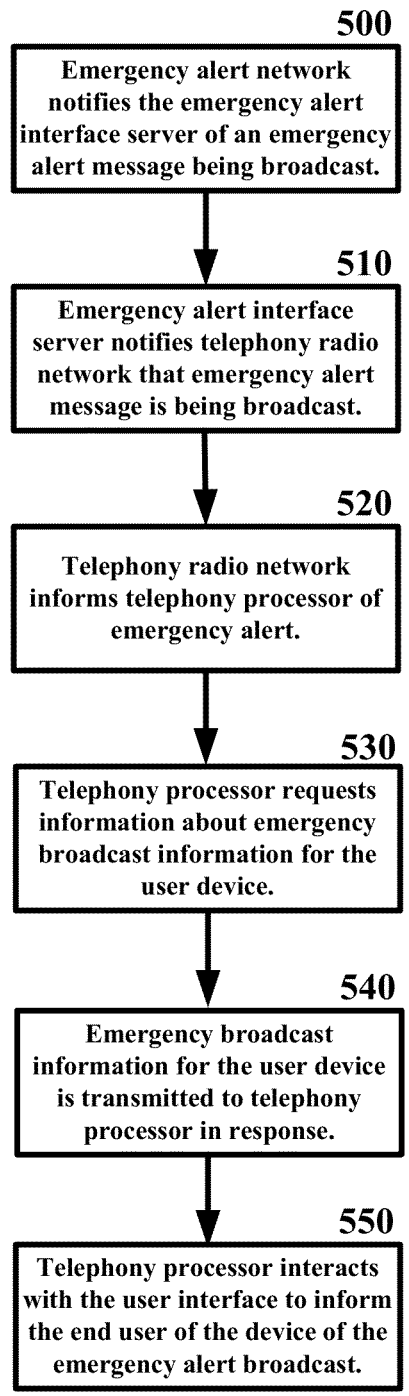
FIG. 2 is a flow diagram of an exemplary implementation of a process whereby a user's device becomes aware of an emergency alert in accordance with the invention.
Figure 3:
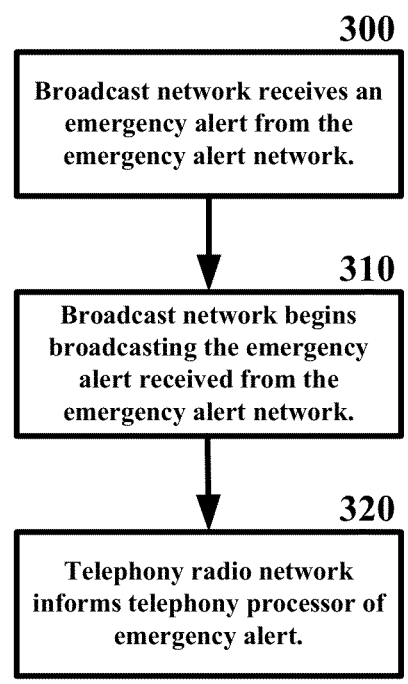
FIG. 3 is an exemplary, non-limiting flow diagram of a process for delivering emergency information via broadcast networks supported by a broadcast processor of the user device.
Figure 4A:
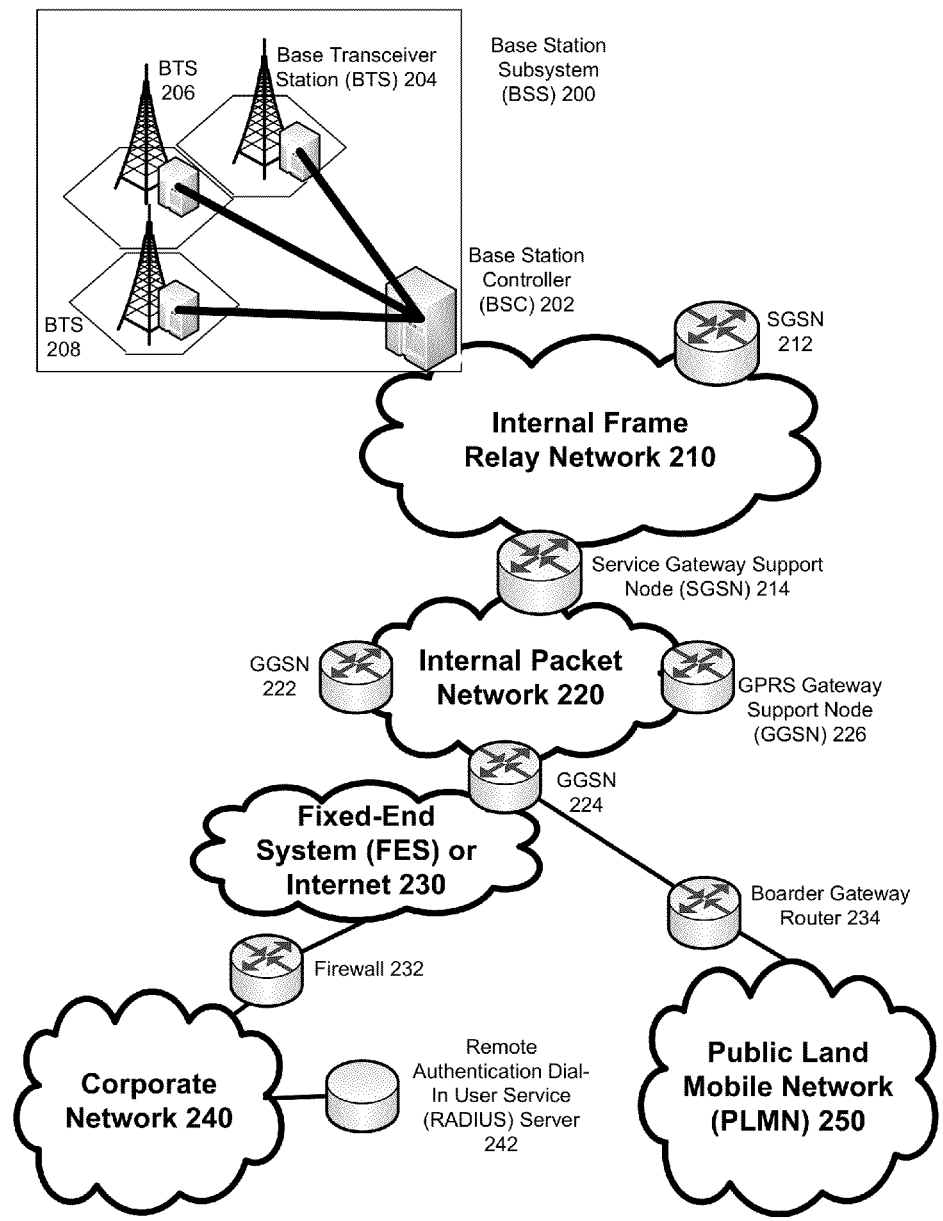
FIG. 4A illustrates an overview of a network environment suitable for service by embodiments of the invention.
Figure 4B:
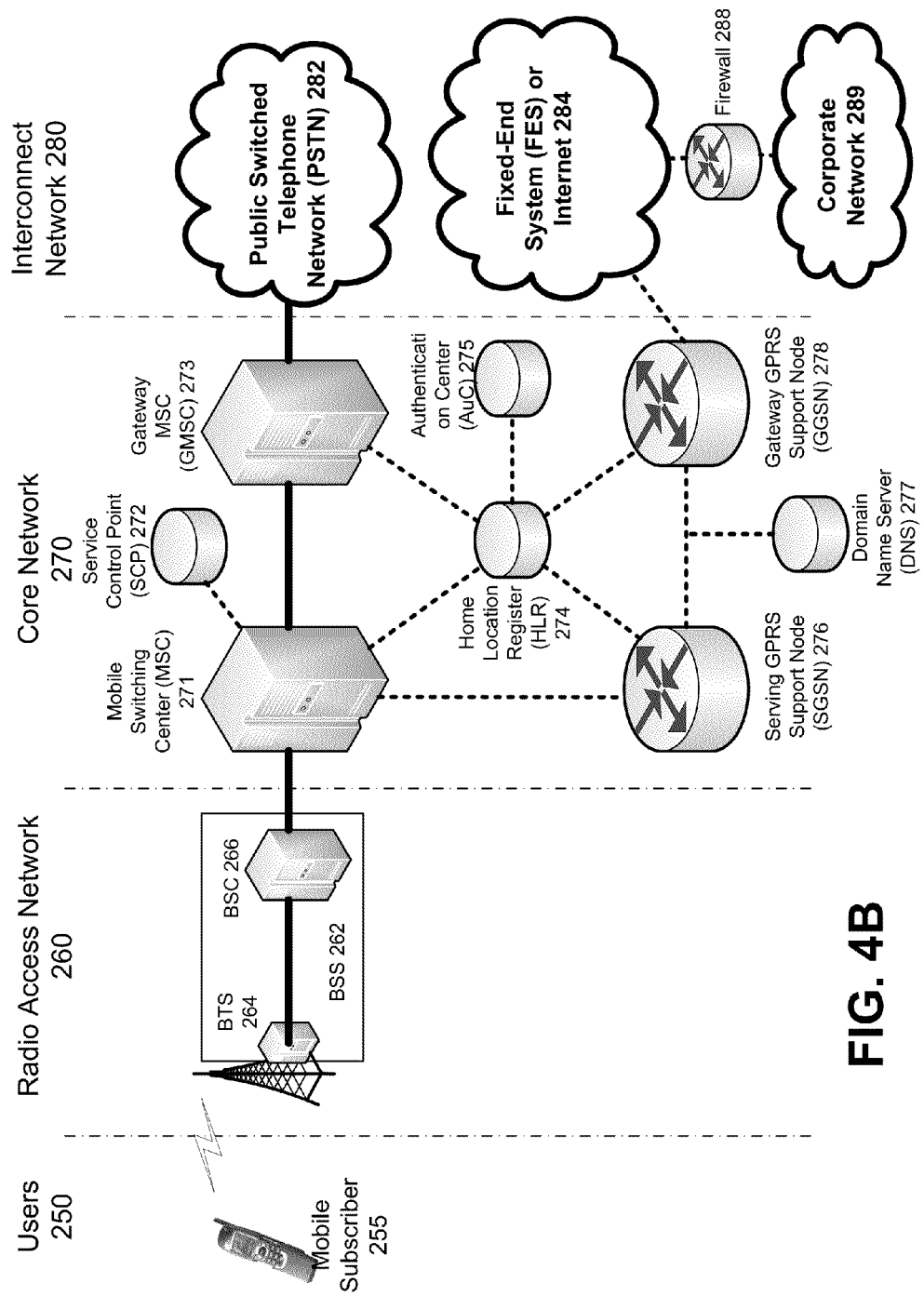
FIG. 4B illustrates a GPRS network architecture that may incorporate various aspects of the invention.
Figure 4C:
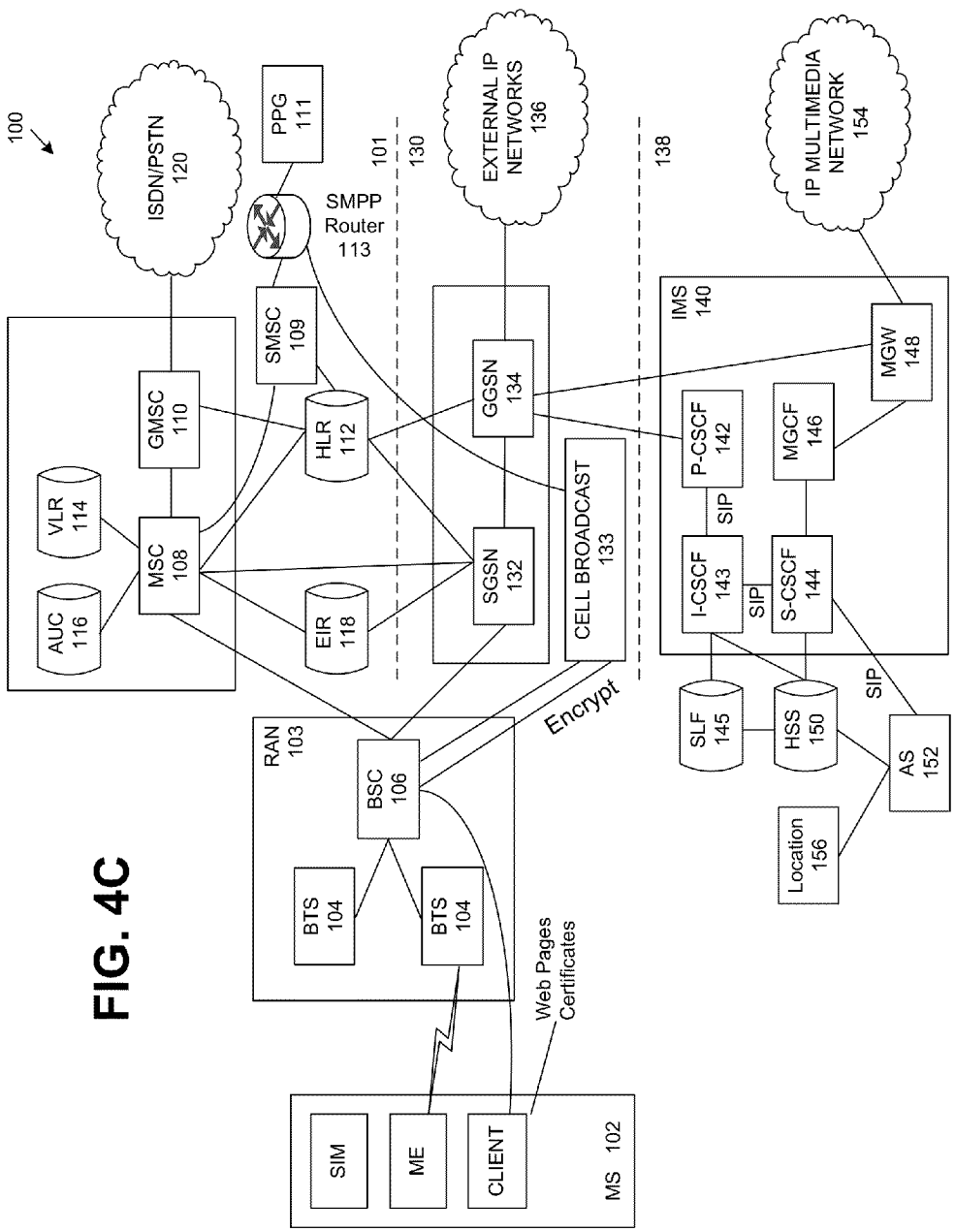
FIG. 4C illustrates an alternate block diagram of an exemplary GSM/GPRS/IP multimedia network architecture in which the invention may be employed.

FIG. 1 is further described with reference to the exemplary, non-limiting flow diagrams of FIGS. 2 and 3. FIGS. 2 and 3 provide description of exemplary implementation of the various methods and systems of the receiving EAS broadcasts. FIG. 2 is a flow diagram of an exemplary implementation of a process whereby a user's device becomes aware of an emergency alert. At 500, an emergency alert network 50 notifies the emergency alert interface server/services 40, which is communicatively coupled to network 30, such as a carrier network, that an emergency alert message is being broadcast. At 510, the emergency alert interface server 40 notifies the telephony radio network 30 that an emergency alert is being broadcast using broadcast technologies. At 520, the telephony radio network 30 informs the telephony processor 24 of portable device 20 that an emergency alert message is being broadcast, e.g., using a pre-defined, standardized indicator bit on at least one telephony network control channel, an SMS message, a data channel if available, etc.

Next, at 530, the telephony network processor 24 on the user device 20 requests the user device database 22 to provide any pre-provisioned information about emergency broadcast information associated with user device 20. Then, in response at 540, the user device database 22 returns any one or more of the following non-exhaustive, non-limiting, types of emergency alerting information to the telephony processor 24 on the user device 20: available broadcast technologies (e.g., Cell Broadcast, MBMS, DVB-H, MediaFLO), broadcast technologies supported by the device 20 or associated emergency broadcast channels for each available broadcast technology.

Finally, at 550, using the information from the user device 20 retrieved at step 540, the telephony processor 24 interacts with the user interface 28 of the user device 20 to inform the end user that an emergency alert is being broadcast. User interface 28 is not limited to display of information, however. Any known output device for a user device 20 may be utilized, whether visual, auditory and/or mechanical in operation. For example, special alert tones may be activated and special display graphics, symbols, text, etc. may be portrayed on a display of the user device 20 that inform the user that an emergency broadcast is being sent and to which channel or channels the user should tune for the emergency broadcast. In a non-limiting embodiment, a programmed soft key (or hardware control) may be provided for the end user to access the emergency broadcast immediately, or as mentioned, optionally, the user device 20 may automatically tune to the emergency broadcast.

FIG. 3 is an exemplary, non-limiting flow diagram of a process, which may proceed independent of and concurrently with the process of FIG. 2, for delivering emergency information via any of the existing broadcast technologies supported by a broadcast processor 26 of the user device 20. In FIG. 3, at 300, the broadcast network(s) 60 receive an emergency alert from the emergency alert network 50, such as the EAS. Then, at 310, the broadcast network starts broadcasting the received emergency alert. Then, at 320, whether activation occurs automatically or optionally at the behest of a user that has been notified of the alert (e.g., via the process of FIG. 2), the associated emergency broadcast channel of the user device 20 is activated, the broadcast processor 26 receives the broadcasted emergency alert data and displays the emergency alert via the user interface 28 of the user device 20.

EAS Alerting by Automatically Adjusting User Settings on a Handset

Some portable devices may provide a user with the ability to turn off the emergency alert monitoring because of the reasons mentioned above. For example, continuous monitoring of the control channel for emergency broadcasts can cause a drain on battery life. Moreover, there are some messages that are sent on the emergency broadcast system that users may not want to receive. Consequently, a number of users choose to change the settings on the portable device to disable monitoring of emergency broadcasts.

Such disabling of emergency broadcast monitoring is problematic in certain emergency situations such as a terrorist attack, a chemical spill, etc. In such instances, portable devices that have the emergency broadcast monitoring turned off will not receive the message. Consequently, the users of such portable devices may not be aware of the emergency situation. In order to overcome that issue, an indicator such as a flag is set in the system information sent to the phone to cause the phone to turn on broadcast channel monitoring regardless of user selected phone settings. The flag could be a bit, a byte, a set of bits, etc. that represent the state of the EAS broadcast system. For example, a bit could be set to indicate that EAS broadcast is on or not set to indicate that EAS broadcast is off.

In one embodiment, the flag is part of the control channel information directed specifically to the phone. In another embodiment, the flag is set in channel information that is simultaneously monitored by all phones in a particular cell.

Common channels can be accessed both by idle mode and dedicated mode mobiles. Common channels are used by idle mode mobiles to exchange the signaling information required to change to dedicated mode. Mobiles already in dedicated mode monitor the surrounding base stations for handover and other information. The common channels include:

Broadcast Control Channel (BCCH): Continuously broadcasts, on the downlink, information including base station identity, frequency allocations, and frequency-hopping sequences.

Frequency Correction Channel (FCCH) and Synchronization Channel (SCH): Used to synchronize the portable device to the time slot structure of a cell. Every cell in a GSM network broadcasts one FCCH and one SCH, which are on time slot 0.

Random Access Channel (RACH): Slotted Aloha channel used by the portable device to request access to the network.

Paging Channel (PCH): Used to alert the portable device of an incoming call.

Access Grant Channel (AGCH): Used to allocate an SDCCH to a portable device for signaling (in order to obtain a dedicated channel), following a request on the RACH.

The flag could be set on any one of the above communication channels between a portable device and a base station. Moreover, the flag could be set on a different control channel than those outlined above as various communication standards evolved and new standards are defined. More specifically, a flag indicating that EAS cell broadcast is on or off is sent in the system information message. When the flag is set to indicate EAS cell broadcast is on, The portable device can then immediately change the portable device settings to turn on the cell broadcast feature, overriding previous user settings.

The portable device could be programmed to revert to the previous user settings after a timeout period. Alternatively, the portable device could change the settings back to the user settings when the flag is changed in the system information to EAS cell broadcast is off.

Exemplary Non-Limiting Network and Operating Environments

The following description sets forth some exemplary telephony radio networks and non-limiting operating environments for the EAS alert reporting services of the present invention. The below-described operating environments should be considered non-exhaustive, however, and thus the below-described network architectures merely show how the services of the present invention may be incorporated into existing network structures and architectures. One can appreciate, however, that the invention may be incorporated into now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

FIG. 5A depicts an overall block diagram of an exemplary packet-based mobile cellular network environment, such as a GPRS network, in which the invention may be practiced. In such an environment, there are a plurality of Base Station Subsystems ("BSS") 200 (only one is shown), each of which comprises a Base Station Controller ("BSC") 202 serving a plurality of Base Transceiver Stations ("BTS") such as BTSs 204, 206, and 208. BTSs 204, 206, 208, etc. are the access points where users of packet-based mobile devices become connected to the wireless network. In exemplary fashion, the packet traffic originating from user devices is transported over the air interface to a BTS 208, and from the BTS 208 to the BSC 202. Base station subsystems, such as BSS 200, are a part of internal frame relay network 210 that may include Service GPRS Support Nodes ("SGSN") such as SGSN 212 and 214. Each SGSN is in turn connected to an internal packet network 220 through which a SGSN 212, 214, etc. can route data packets to and from a plurality of gateway GPRS support nodes (GGSN) 222, 224, 226, etc. As illustrated, SGSN 214 and GGSNs 222, 224, and 226 are part of internal packet network 220. Gateway GPRS serving nodes 222, 224 and 226 mainly provide an interface to external Internet Protocol ("IP") networks such as Public Land Mobile Network ("PLMN") 250, corporate intranets 240, or Fixed-End System ("FES") or the public Internet 230. As illustrated, subscriber corporate network 240 may be connected to GGSN 224 via firewall 232; and PLMN 250 is connected to GGSN 224 via boarder gateway router 234. The Remote Authentication Dial-In User Service ("RADIUS") server 242 may be used for caller authentication when a user of a mobile cellular device calls corporate network 240.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

FIG. 5B illustrates the architecture of a typical GPRS network as segmented into four groups: users 250, radio access network 260, core network 270, and interconnect network 280. Users 250 comprise a plurality of end users (though only mobile subscriber 255 is shown in FIG. 5B). Radio access network 260 comprises a plurality of base station subsystems such as BSSs 262, which include BTSs 264 and BSCs 266. Core network 270 comprises a host of various network elements. As illustrated here, core network 270 may comprise Mobile Switching Center ("MSC") 271, Service Control Point ("SCP") 272, gateway MSC 273, SGSN 276, Home Location Register ("HLR") 274, Authentication Center ("AuC") 275, Domain Name Server ("DNS") 277, and GGSN 278. Interconnect network 280 also comprises a host of various networks and other network elements. As illustrated in FIG. 5B, interconnect network 280 comprises Public Switched Telephone Network ("PSTN") 282, Fixed-End System ("FES") or Internet 284, firewall 288, and Corporate Network 289.

A mobile switching center can be connected to a large number of base station controllers. At MSC 271, for instance, depending on the type of traffic, the traffic may be separated in that voice may be sent to Public Switched Telephone Network ("PSTN") 282 through Gateway MSC ("GMSC") 273, and/or data may be sent to SGSN 276, which then sends the data traffic to GGSN 278 for further forwarding.

When MSC 271 receives call traffic, for example, from BSC 266, it sends a query to a database hosted by SCP 272. The SCP 272 processes the request and issues a response to MSC 271 so that it may continue call processing as appropriate.

The HLR 274 is a centralized database for users to register to the GPRS network. HLR 274 stores static information about the subscribers such as the International Mobile Subscriber Identity ("IMSI"), subscribed services, and a key for authenticating the subscriber. HLR 274 also stores dynamic subscriber information such as the current location of the mobile subscriber. Associated with HLR 274 is AuC 275. AuC 275 is a database that contains the algorithms for authenticating subscribers and includes the associated keys for encryption to safeguard the user input for authentication.

In the following, depending on context, the term "mobile subscriber" sometimes refers either to the end user and sometimes to the actual portable device used by an end user of the mobile cellular service. When a mobile subscriber turns on his or her mobile device, the mobile device goes through an attach process by which the mobile device attaches to an SGSN of the GPRS network. In FIG. 5B, when mobile subscriber 255 initiates the attach process by turning on the network capabilities of the mobile device, an attach request is sent by mobile subscriber 255 to SGSN 276. The SGSN 276 queries another SGSN, to which mobile subscriber 255 was attached before, for the identity of mobile subscriber 255. Upon receiving the identity of mobile subscriber 255 from the other SGSN, SGSN 276 requests more information from mobile subscriber 255. This information is used to authenticate mobile subscriber 255 to SGSN 276 by HLR 274. Once verified, SGSN 276 sends a location update to HLR 274 indicating the change of location to a new SGSN, in this case SGSN 276. HLR 274 notifies the old SGSN, to which mobile subscriber 255 was attached before, to cancel the location process for mobile subscriber 255. HLR 274 then notifies SGSN 276 that the location update has been performed. At this time, SGSN 276 sends an Attach Accept message to mobile subscriber 255, which in turn sends an Attach Complete message to SGSN 276.

After attaching itself with the network, mobile subscriber 255 then goes through the authentication process. In the authentication process, SGSN 276 sends the authentication information to HLR 274, which sends information back to SGSN 276 based on the user profile that was part of the user's initial setup. The SGSN 276 then sends a request for authentication and ciphering to mobile subscriber 255. The mobile subscriber 255 uses an algorithm to send the user identification (ID) and password to SGSN 276. The SGSN 276 uses the same algorithm and compares the result. If a match occurs, SGSN 276 authenticates mobile subscriber 255.

Next, the mobile subscriber 255 establishes a user session with the destination network, corporate network 289, by going through a Packet Data Protocol ("PDP") activation process. Briefly, in the process, mobile subscriber 255 requests access to the Access Point Name ("APN"), for example, UPS.com (e.g., which can be corporate network 279 in FIG. 3) and SGSN 276 receives the activation request from mobile subscriber 255. SGSN 276 then initiates a Domain Name Service ("DNS") query to learn which GGSN node has access to the UPS.com APN. The DNS query is sent to the DNS server within the core network 270, such as DNS 277, which is provisioned to map to one or more GGSN nodes in the core network 270. Based on the APN, the mapped GGSN 278 can access the requested corporate network 279. The SGSN 276 then sends to GGSN 278 a Create Packet Data Protocol ("PDP") Context Request message that contains necessary information. The GGSN 278 sends a Create PDP Context Response message to SGSN 276, which then sends an Activate PDP Context Accept message to mobile subscriber 255.

Once activated, data packets of the call made by mobile subscriber 255 can then go through radio access network 260, core network 270, and interconnect network 280, in particular fixed-end system or Internet 284 and firewall 288, to reach corporate network 289.

Thus, network elements that may implicate the functionality of the EAS alert reporting in accordance with the invention may include but are not limited to Gateway GPRS Support Node tables, Fixed End System router tables, firewall systems, VPN tunnels, and any number of other network elements as required by the particular digital network.

FIG. 5C shows another exemplary block diagram view of a GSM/GPRS/IP multimedia network architecture 100 in which the EAS alerting and reporting of the present invention may be incorporated. As illustrated, architecture 100 of FIG. 5C includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

A Short Message Service Center (SMSC) 109 allows one-to-one Short Message Service (SMS) messages to be sent to/from the MS 102. A Push Proxy Gateway (PPG) 111 is used to "push" (i.e., send without a synchronous request) content to the MS 102. The PPG 111 acts as a proxy between wired and wireless networks to facilitate pushing of data to the MS 102. A Short Message Peer to Peer (SMPP) protocol router 113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132, a cell broadcast and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls.

A Cell Broadcast Center (CBC) 133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While the present invention has been described in connection with the preferred embodiments of the various Figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

What is claimed is:

1. A method comprising:
   receiving, at a first portable device, emergency broadcast information from a network-based emergency broadcast information database, wherein the emergency broadcast information comprises information about available broadcast technologies, information about emergency broadcast channels associated with each available broadcast technology, and information concerning which broadcast technologies or networks are supported by the first portable device, the first portable device including storage, at least one telephony processor, and at least one broadcast processor;
   storing, by the first portable device, the emergency broadcast information in the storage of the first portable device;
   receiving, at the first portable device an update to the emergency broadcast information from the network-based emergency broadcast information database, wherein the update to the emergency broadcast information comprises updated information about available broadcast technologies, updated information about emergency broadcast channels associated with each available broadcast technology, and updated information concerning which broadcast technologies or networks are supported by the first portable device;
   storing, by the first portable device, the update to the emergency broadcast information in the storage of the first portable device;
   receiving, at the first portable device, a user setting, the user setting instructing the broadcast processor of the first portable device not to engage in emergency broadcast monitoring;
   receiving, at the first portable device, an indicator bit from a telephony network control channel, the indicator bit indicating that the emergency alert is being broadcast, wherein the telephony network is notified by an emergency alert interface service that the emergency alert is being broadcast using broadcast technologies, wherein the emergency alert interface service is notified by an emergency alert network that an emergency alert is being broadcast, wherein information on the control channel is directed to the first portable device in the cellular network, wherein the indicator bit is received after the emergency broadcast information has been received and stored by the first portable device;
   enforcing the user defined settings associated with the first portable device by the telephony processor when the indicator bit indicates that the emergency alert is not being broadcast;
   requesting, by the telephony processor of the first portable device, the emergency broadcast information from the storage of the first portable device when the indicator bit indicates that the emergency alert is being broadcast;
   receiving, at the telephony processor, the requested emergency broadcast information from the storage of the first portable device;
   overriding the user defined settings associated with the first portable device to enable emergency broadcast monitoring on the first portable device by the telephony processor when the indicator bit indicates that the emergency alert is being broadcast;
   utilizing, by the telephony processor, the stored emergency broadcast information and the update to the emergency broadcast information to tune to a broadcast channel of a broadcast network upon overriding the user defined settings associated with the first portable device to enable emergency broadcast monitoring by a broadcast processor;
   receiving, at the broadcast processor, an emergency broadcast from the emergency alert network;
   outputting, by the broadcast processor, at least a portion of the emergency broadcast associated with the emergency alert on the first portable device; and
   reverting back to the user defined settings on the first portable device after a predefined period of time has expired on the first portable device.

2. The method as recited in claim 1, wherein the first portable device comprises a mobile phone.

3. The method as recited in claim 1, wherein the indicator bit is a bit received over the telephony network control channel associated with the emergency alert.

4. The method as recited in claim 1, wherein the indicator bit indicates the emergency alert is no longer being broadcast.

5. The method of claim 1, wherein outputting at least a portion of the emergency broadcast associated with the emergency alert on the first portable device comprises the use of at least one of a visual output, an auditory output, or a mechanical output.

6. The method of claim 1, wherein the telephony network control channel comprises at least one of a frequency correction channel, a synchronization channel, a random access channel, a paging channel, or an access grant channel.

7. A mobile device comprising:
a user storage device;
a user interface;
a telephony processor; and
a broadcast processor, wherein:
the first mobile device is in communication with a network-based emergency broadcast information database and a telephony radio network, an emergency alert interface server is in communication with a telephony radio network, an emergency alert network is in communication with the emergency alert interface; a broadcast network is in communication with the emergency alert network and the first mobile device;
the first mobile device receives emergency broadcast information from the network-based emergency broadcast information database and stores the emergency broadcast information in the user storage device, the emergency broadcast information comprising information about available broadcast technologies, information about emergency broadcast channels associated with each available broadcast technology, and information concerning which broadcast technologies or networks are supported by the first mobile device;
the first mobile device receives an update to the emergency broadcast information from the network-based emergency broadcast information database, the update to the emergency broadcast information comprising updated information about available broadcast technologies, updated information about emergency broadcast channels associated with each available broadcast technology, and updated information concerning which broadcast technologies or networks are supported by the first mobile device;
the first mobile device stores the update to the emergency broadcast information in the storage of the first mobile device;
the first mobile device receives a user setting, the user setting instructing the broadcast processor of the first mobile device not to engage in emergency broadcast monitoring;
the first mobile device receives an indicator bit from a telephony network control channel, the indicator bit indicating that the emergency alert is being broadcast, wherein the telephony network is notified by an emergency alert interface service that the emergency alert is being broadcast using broadcast technologies, wherein the emergency alert interface service is notified by an emergency alert network that an emergency alert is being broadcast, wherein information on the control channel is directed to the first portable device in the cellular network, wherein the indicator bit is received after the emergency broadcast information has been received and stored by the first mobile device;
the telephony processor enforcing the user defined settings associated with the first mobile device when the indicator bit indicates that the emergency alert is not being broadcast;
the telephony processor requesting the emergency broadcast information from the storage of the first mobile device when the indicator bit indicates that the emergency alert is being broadcast;
the telephony processor receiving the requested emergency broadcast information from the storage of the first mobile device;
the broadcast processor overriding the user defined settings associated with the first mobile device to enable emergency broadcast monitoring when the indicator bit indicates that the emergency alert is being broadcast;
the telephony processor utilizing the stored emergency broadcast information and the update to the emergency broadcast information to tune to a broadcast channel of the broadcast network upon overriding the user defined settings associated with the first mobile device to enable emergency broadcast monitoring by the broadcast processor;
receiving, at the broadcast processor, an emergency broadcast from the emergency alert network;
outputting, by the broadcast processor, at least a portion of the emergency broadcast associated with the emergency alert on the first mobile device; and
reverting back to the user defined settings on the first mobile device after a predefined period of time has expired on the first mobile device.

8. The mobile device of claim 7 wherein the first mobile device comprises a mobile phone.

9. The mobile device of claim 8 wherein the first mobile device is adapted to revert back to the preexisting setting when the indicator bit indicates the emergency broadcast has stopped.

10. The mobile device of claim 7 wherein the indicator bit comprises at least one bit in a message.

11. The mobile device of claim 7, wherein outputting at least a portion of the emergency broadcast associated with the emergency alert on the first portable device comprises the use of at least one of a visual output, an auditory output, or a mechanical output.

12. The mobile device of claim 7, wherein the telephony network control channel comprises at least one of a frequency correction channel, a synchronization channel, a random access channel, a paging channel, or an access grant channel.

13. A storage device having stored thereon computer executable instructions when executed by a processor cause the processor to effectuate operations comprising:
receiving, at a first portable device, emergency broadcast information from a network-based emergency broadcast information database, the emergency broadcast information comprising information about available broadcast technologies, information about emergency broadcast channels associated with each available broadcast technology, and information concerning which broadcast technologies or networks are supported by the first portable device, the first portable device including at least one telephony processor, and at least one broadcast processor;
storing, by the first portable device, the emergency broadcast information;
receiving, at the first portable device, an update to the emergency broadcast information from the network-based emergency broadcast information database, wherein the update to the emergency broadcast information comprises updated information about available broadcast technologies, updated information about emergency broadcast channels associated with each available broadcast technology, and updated information concerning which broadcast technologies or networks are supported by the first portable device;

storing, at the first portable device, the update to the emergency broadcast information;

receiving, at the first portable device, a user setting, the user setting instructing the broadcast processor of the first portable device not to engage in emergency broadcast monitoring;

receiving, at the first portable device, an indicator bit from a telephony network control channel, the indicator bit indicating that the emergency alert is being broadcast, wherein the telephony network is notified by an emergency alert interface service that the emergency alert is being broadcast using broadcast technologies, wherein the emergency alert interface service is notified by an emergency alert network that an emergency alert is being broadcast, wherein information on the control channel is directed to the first portable device in the cellular network, wherein the indicator bit is received after the emergency broadcast information has been received and stored by the first portable device;

enforcing the user defined settings associated with the first portable device by the telephony processor when the indicator bit indicates that the emergency alert is not being broadcast;

requesting, by the telephony processor of the first portable device, the emergency broadcast information from the storage of the first portable device when the indicator bit indicates that the emergency alert is being broadcast;

receiving, at the telephony processor, the requested emergency broadcast information from the storage of the first portable device;

overriding the user defined settings associated with the first portable device to enable emergency broadcast monitoring on the first portable device by the broadcast processor when the indicator bit indicates that the emergency alert is being broadcast;

utilizing, by the telephony processor, the stored emergency broadcast information and the update to the emergency broadcast information to tune to a broadcast channel of a broadcast network upon overriding the user defined settings associated with the first portable device to enable emergency broadcast monitoring by a broadcast processor;

receiving, at the broadcast processor, an emergency broadcast from the emergency alert network;

outputting, by the broadcast processor, at least a portion of the emergency broadcast associated with the emergency alert on the first portable device; and reverting back to the user defined settings on the first portable device after a predefined period of time has expired on the first portable device.

14. The storage device as recited in claim 13 wherein the first portable device comprises a mobile phone.

15. The storage device as recited in claim 13 wherein the indicator bit comprises at least one bit in a message.

16. The storage device of claim 13, wherein outputting at least a portion of the emergency broadcast associated with the emergency alert on the first portable device comprises the use of at least one of a visual output, an auditory output, or a mechanical output.

17. The storage device of claim 13, wherein the telephony network control channel comprises at least one of a frequency correction channel, a synchronization channel, a random access channel, a paging channel, or an access grant channel.

* * * * *